US008388059B2

(12) United States Patent
Guenther et al.

(10) Patent No.: US 8,388,059 B2
(45) Date of Patent: Mar. 5, 2013

(54) ACTUATING MEANS FOR A CRASH-ACTIVE HEAD RESTRAINT

(75) Inventors: Benjamin Guenther, Solingen (DE); Klaus Sperling, Bonn (DE); Marcus Thies, Gevelsberg (DE); Silvio Hartlaub, Sinnersdorf (DE); Joshua Hesterberg, Mettmann (DE)

(73) Assignee: Johnson Controls Technology Company, Holland, MI (US)

(*) Notice: Subject to any disclaimer, the term of this patent is extended or adjusted under 35 U.S.C. 154(b) by 530 days.

(21) Appl. No.: 12/525,470

(22) PCT Filed: Jan. 31, 2008

(86) PCT No.: PCT/EP2008/000734

§ 371 (c)(1), (2), (4) Date: Feb. 16, 2010

(87) PCT Pub. No.: WO2008/095636

PCT Pub. Date: Aug. 14, 2008

(65) Prior Publication Data

US 2010/0148544 A1 Jun. 17, 2010

(30) Foreign Application Priority Data

Feb. 7, 2007 (DE) ........................ 10 2007 006 835

(51) Int. Cl.
*B60N 2/48* (2006.01)

(52) U.S. Cl. ................................ 297/216.12; 297/284.8

(58) Field of Classification Search ............ 297/216.12, 297/284.4, 284.8; 16/262, 265, 368, 369; 403/150, 152

See application file for complete search history.

(56) References Cited

U.S. PATENT DOCUMENTS

| | | | | |
|---|---|---|---|---|
| 4,515,424 | A * | 5/1985 | Sakurai | 439/325 |
| 5,664,841 | A * | 9/1997 | Dal Monte | 297/408 |
| 6,070,296 | A * | 6/2000 | Abeln et al. | 16/261 |
| 6,701,573 | B1 * | 3/2004 | Ciavarella et al. | 16/266 |
| 6,749,256 | B1 * | 6/2004 | Klier et al. | 297/216.12 |
| 7,044,545 | B2 * | 5/2006 | Ohchi et al. | 297/216.12 |
| 7,097,242 | B2 * | 8/2006 | Farquhar et al. | 297/216.12 |
| 7,484,798 | B2 * | 2/2009 | Yamaguchi | 297/216.12 |
| 7,992,932 | B2 * | 8/2011 | Hartlaub | 297/216.12 |
| 2006/0202524 | A1 * | 9/2006 | Yamaguchi | 297/216.12 |
| 2007/0262631 | A1 | 11/2007 | Hartlaub | |

FOREIGN PATENT DOCUMENTS

| | | | |
|---|---|---|---|
| DE | 10 2006 036 623 | B3 | 10/2007 |
| EP | 1 625 970 | A1 | 2/2006 |
| WO | 2006037801 | A1 | 4/2006 |

* cited by examiner

*Primary Examiner* — Peter R. Brown

(74) *Attorney, Agent, or Firm* — Fletcher Yoder P.C.

(57) ABSTRACT

An actuating system for a head restraint of a vehicle seat is provided. The head restraint includes a part that can be shifted from a comfort position to a safety position, such as in the event of an accident. Limbs are expandable from an initial position as a consequence of pressure loading to bring about a lengthening which can be transmitted to force transmission means. The limbs are connected to one another and/or to fastening means by joints, each having a first and a second joint pin which can be inserted axially into holes to form the joints.

15 Claims, 5 Drawing Sheets

10 3.1 7.2 3.2 6.2 4 3.3 7.4 3.4 10 C H VS 2 1 7.1 6.1 7.3 6.3 5

ACTUATING MEANS FOR A CRASH-ACTIVE HEAD RESTRAINT

CROSS REFERENCE TO RELATED APPLICATIONS

This application claims priority from and the benefit of PCT Application No. PCT/EP2008/000734, filed on Jan. 31, 2008; and German Patent No. DE 10 2007 006 835.4, filed on Feb. 7, 2007; both entitled "Actuating Means for a Crash-Active Head Restraint", which are herein incorporated by reference.

BACKGROUND

The invention relates to an actuating means for the head restraint of a vehicle seat, at least part of which head restraint can be shifted from a comfort position into a safety position in the event of an accident, comprising limbs which are expanded from an initial position as a consequence of pressure loading and therefore bring about a lengthening which can be transmitted to force transmission means.

A generic actuating means is disclosed in the publication WO 2006/037801 A1. It consists of four limbs connected to one another in an articulated manner, which are folded in a W-shape and of which the first limb grips the sheath of a Bowden cable and the last limb grips the core of a Bowden cable. In the event of pressure loading acting on the actuating means, running at right angles to the extension of the Bowden cable, the cable attached to the limb is stretched, whereby the angle between the limbs is increased and the core of the Bowden cable is pulled to a specific length out of the sheath of the Bowden cable. This lengthening is transmitted to the drive device of the crash-active head restraint which, for example, may correspond to the embodiment according to WO 2005/097545 A2. The contents of the aforementioned publications expressly form part of the disclosure of the present invention.

SUMMARY

The object of the invention is to improve further the known actuating means, in particular with regard to the constructional space, production costs and the range of application.

In generic actuating devices, the object is achieved in that the limbs are connected to one another and/or to fastening elements by means of joints which each have a long joint pin and a short joint pin which can be inserted axially into holes in order to form the joints.

Moreover, an actuating means of the type described in the introduction is suitable for achieving the aforementioned object in which the outer limbs have projections which penetrate the metal structure of the vehicle seat, in particular in the region of a crossmember to the rear from the occupant's side and are suitable for the attachment of a force transmission means, in particular the core and sheath of a Bowden cable.

Such actuating means are advantageously able to be latched onto the metal structure of the vehicle seat and, therefore, may be easily mounted.

Particularly advantageously, the actuating means may be attached to a crossmember made of metal, which may be subsequently connected to an additional prefabricated metal structure of a backrest. In this embodiment, a JIT (just-in-time) production system may be adapted to individual requirements, without the seats, which are not correspondingly equipped, being loaded by components which are only required for the application of the invention.

The limbs preferably consist of injection-molded, frame-like elements, which are provided inside the frame with honeycomb-like support ribs. As a result, essential parts of the actuating means may be produced in a manner which is simple, lightweight and robust.

Preferably, an even number of limbs is provided, the central joint being configured to be fixed relative to the backrest. The expansion of the actuating means, therefore, takes place symmetrically relative to the left and right lateral bars of the backrest structure.

DRAWINGS

The figures represent by way of example and schematically various embodiments of the invention, in which.

DETAILED DESCRIPTION

The directional information refers, provided nothing contrary is mentioned, to the position of the integrated actuating means when the backrest is upright.

Figure 1:
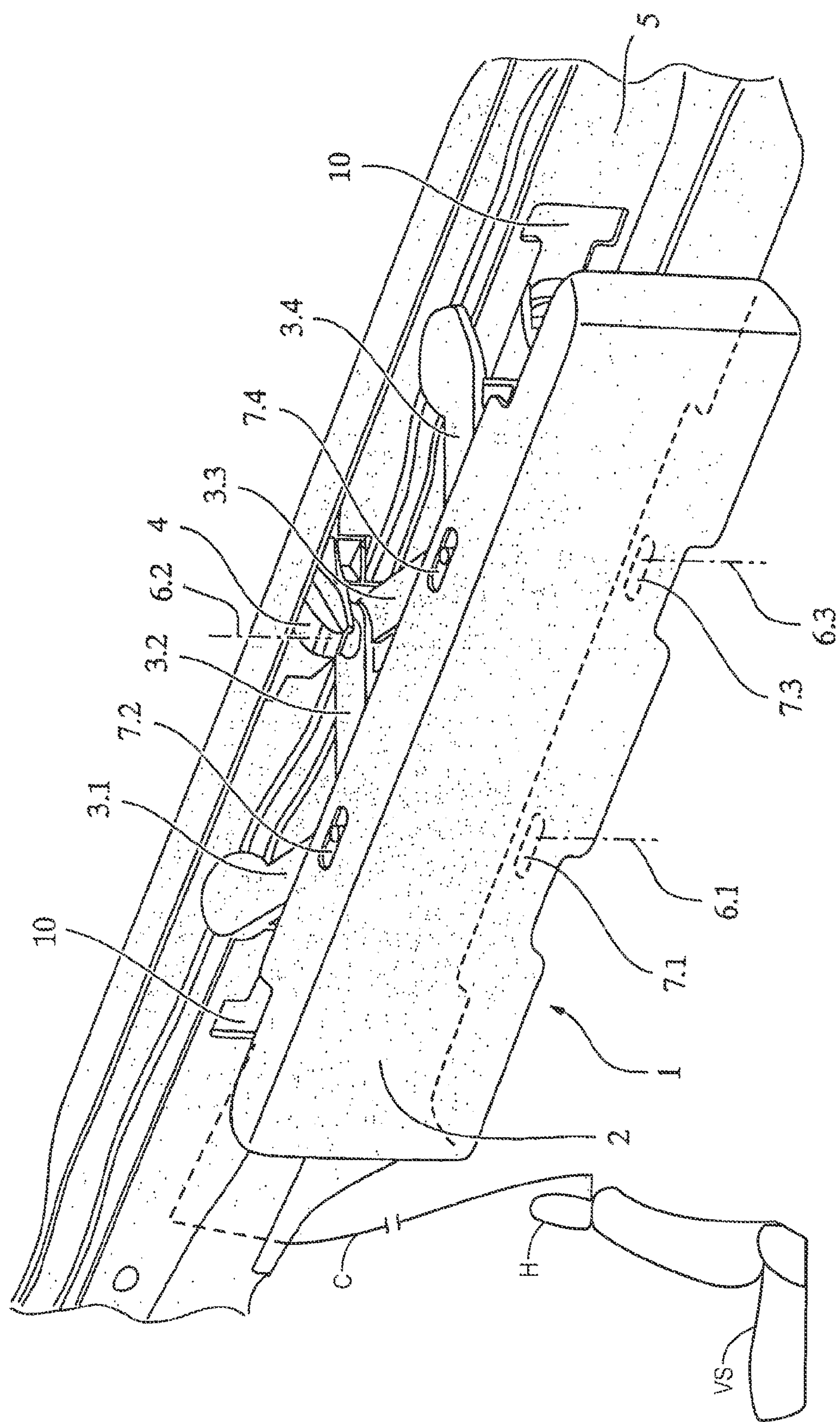
FIG. 1 shows a three-dimensional view of an actuating means according to the invention comprising an impact plate which is shown as transparent.

The actuating means 1 shown in FIG. 1 consists of an impact plate 2, limbs 3.1 to 3.4 as well as a central fastening element 4 which preferably are made by the injection molding of plastics. The actuating means 1 is fastened to a crossmember 5 consisting of metal, which is an integral component of the metal structure of the backrest of the vehicle seat VS or, however, is retrofitted onto the metal structure which, incidentally, has already been manufactured. The fastening element 4 is anchored to the crossmember 5 and is thus fixed relative to the backrest.

Figure 2:
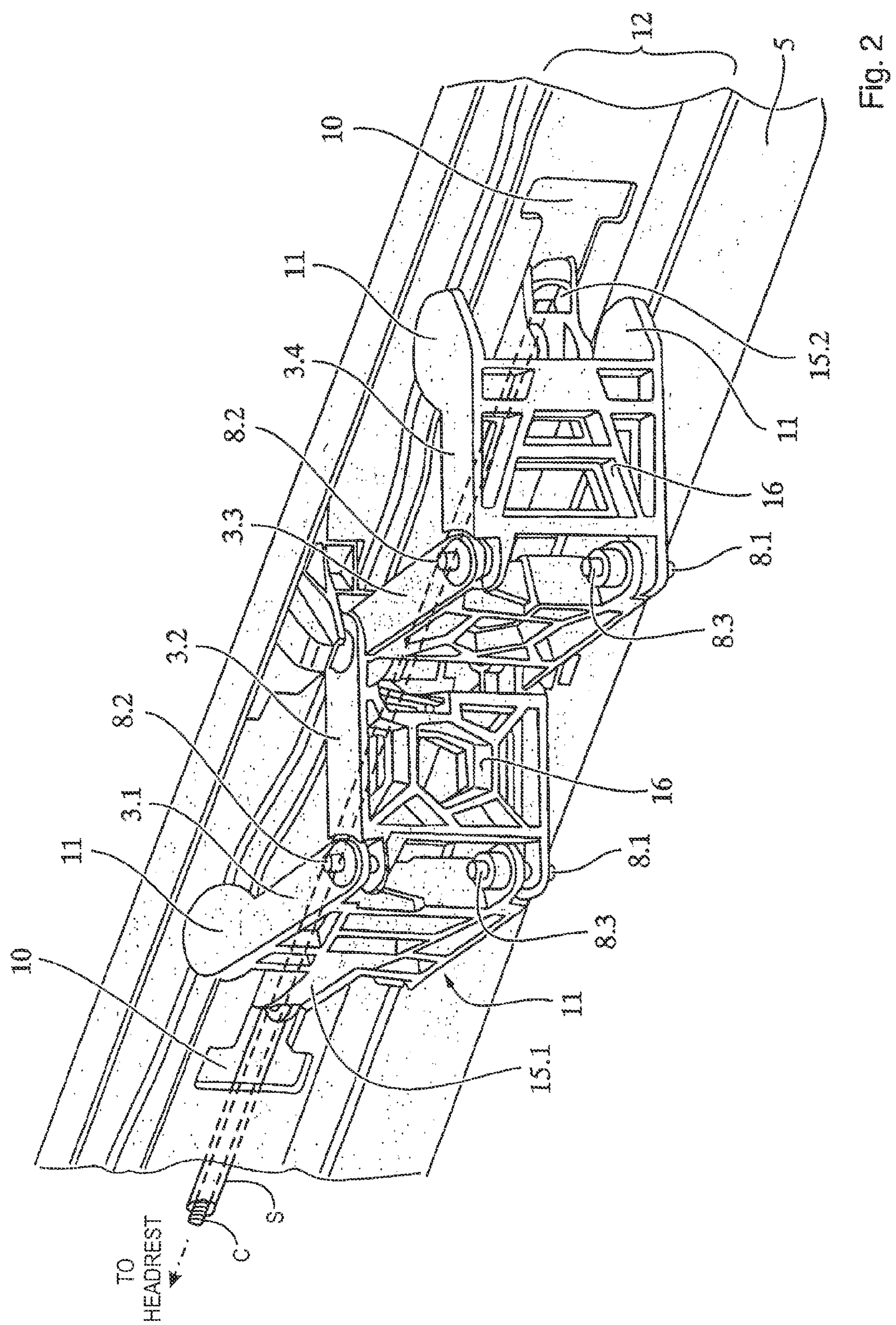
FIG. 2 shows the same actuating means with the impact plate removed.

The central limbs 3.2 and 3.3 form with the fastening element 4 a common joint 6.2 and extend from there to the side in the direction of the ends of the crossmember 5 as well as to the front toward the impact plate 2. The lateral limbs 3.1 and 3.4 are connected via joints 6.1 and/or 6.3 to the central limbs 3.2 and/or 3.3 and guided in the region of these joints 6.1 and 6.3 in slot-shaped guides 7.1 to 7.4, which are removed from the upper and lower horizontal edge surfaces of the impact plate 2 which extends substantially vertically. When the cable attached to the limb is stretched, the pins 8.1 and 8.2 (see FIG. 2) formed in the region of the joints 6.1 and 6.2 on the limbs 3.2 and 3.3 are displaced in the guides 7.1 to 7.4.

The outer limbs 3.1 and 3.4, facing with their external ends away from the impact plate 2 outwardly in the direction of the crossmember 5, are provided at these ends with central projections 15.1, 15.2 which penetrate slot-shaped recesses 10 in the crossmember 5 and are provided for attaching the cylindrical end fittings, not shown, of the core C (projection 15.1 of the limb 3.1 with the recess 17) and/or the sheath S (projection 15.2 of the limb 3.4 with the receiver 18) of a Bowden cable. On the outside, the recesses 10 comprise T-shaped widenings, which serve for passing through the projections 15.1, 15.2 when mounting the limbs 3.1 and 3.4. The limbs 3.1 and 3.4 are, moreover, provided externally on the upper and lower face with flat, horizontally extending projections 11, which encompass a U-shaped chamfer 12 in the crossmember 5 from above and below and, therefore, guide the cable attached to the limb in an extendible manner. Moreover, the limbs 3.1 to 3.4 have a frame-like structure with honeycomb-like support ribs 16 extending therein which provide the limbs 3.1 to 3.4 with a high degree of mechanical strength, with reduced weight.

Figure 3A:
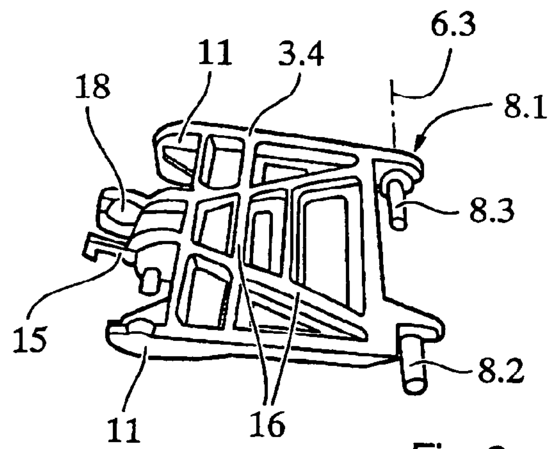
FIG. 3 shows the limbs and fastening element in separate views.
Figure 3B:
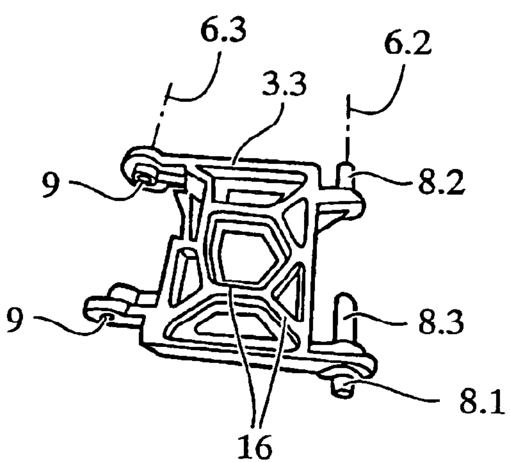
Figure 3C:
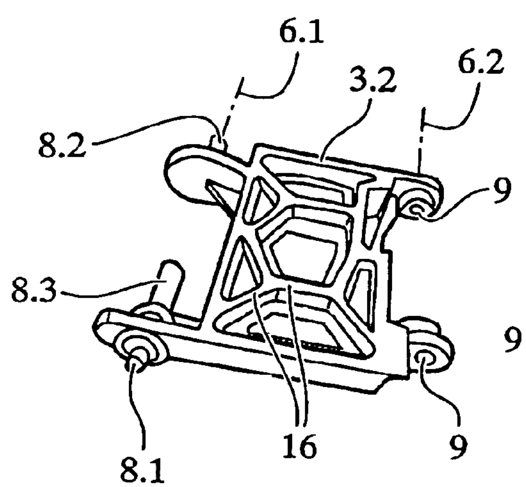
Figure 3D:
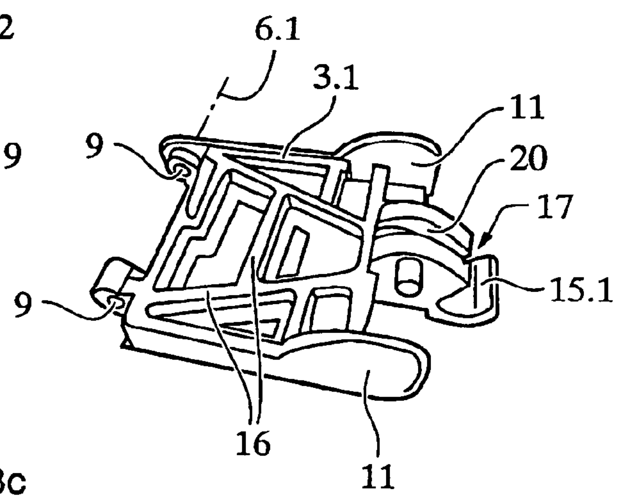
Figure 3E:
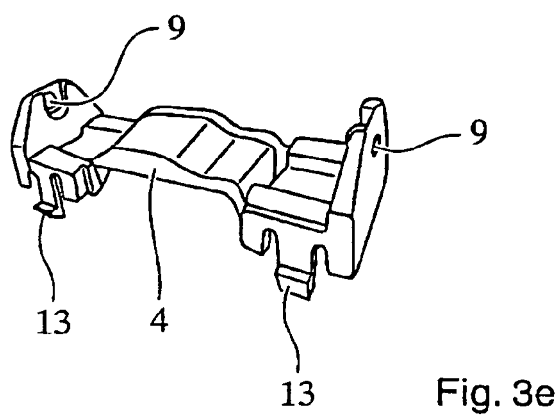

As is visible from FIGS. 3*a* to *d*, the joints 6.1 to 6.3 consist of pins 8.2 and 8.3 formed on the limbs 3.2 to 3.4, which may be inserted into holes 9 of the respective other limb 3.1 to 3.3 as well as the central fastening element 4 (FIG. 3*e*). The pins 8.2 and 8.3 are designed with regard to their length so that the end of the pin 8.2 subsequently projecting from the hole 9 is still sufficiently long in order to permit guidance in the guide 7.1 and/or 7.2.

Figure 4:
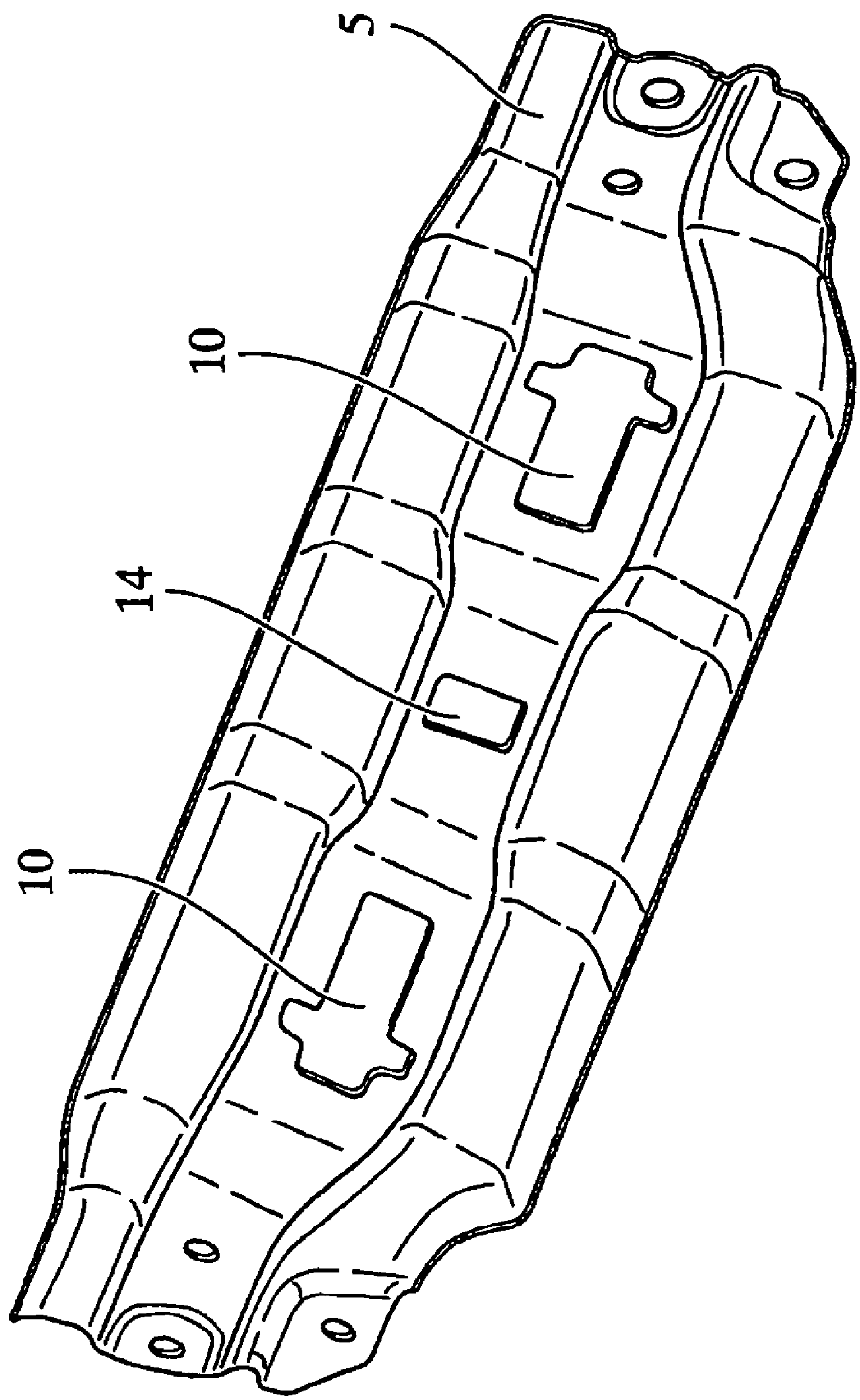
FIG. 4 shows a crossmember suitable for receiving the actuating means in a separate view.

The central fastening element 4 has latching devices 13 which are pushed from the side of the crossmember 5 facing the seat occupant through a rectangular recess 14 (FIG. 4) in the crossmember 5 and which engage behind the crossmember 5. This arrangement also permits subsequent dismantling of the actuating means 1.

Figure 5A:
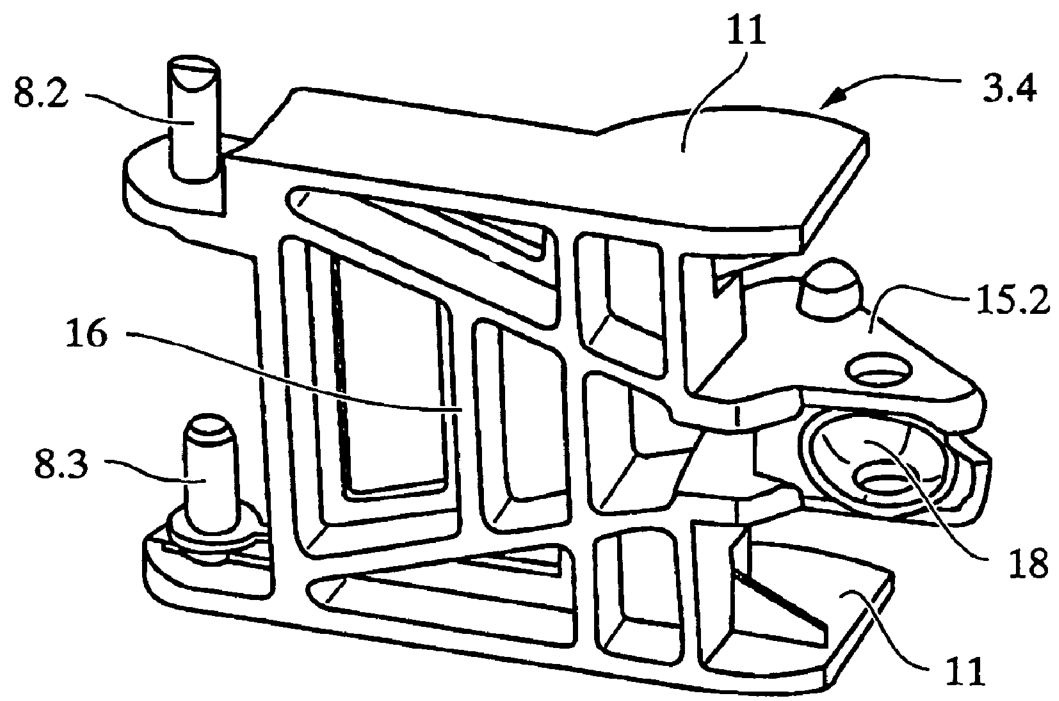
FIG. 5 shows the outer limbs of an actuating means according to a further embodiment of the invention.
Figure 5B:
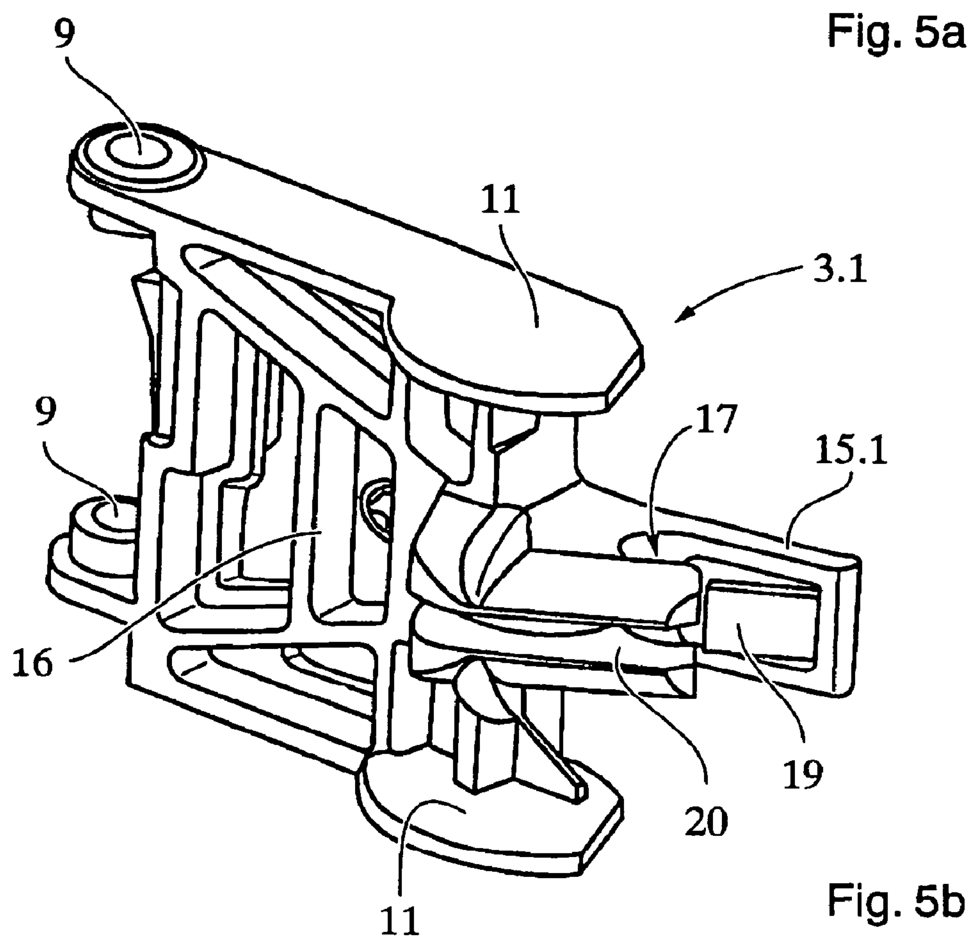

In the embodiment according to FIGS. 5*a, b*, the end fitting of the sheath of the Bowden cable as well as the receiver 18 provided therefor of the limb 3.4 are of spherical shape, so that when inserting the end fitting the sheath does not have to be aligned relative to the limb 3.4, but is configured to be self-aligning by the spherical joint-like connection.

The end fitting attached to the core of the Bowden cable, moreover, is of cylindrical configuration and is inserted during mounting into the receiver 17 adapted thereto in the limb 3.1 and secured by a resilient, clip 19 projecting in a tongue-like manner in the direction of the receiver 17. The core, as in the embodiment according to FIG. 3*d*, is subsequently pivoted into a slot 20 and spanning the limbs 3.2, 3.3 on the rear face of the crossmember 5 is guided toward the limb 3.4 where it enters the sheath of the Bowden cable.

The invention claimed is:

1. An actuating system for a head restraint of a vehicle seat, at least part of which head restraint can be shifted from a comfort position into a safety position in the event of an accident, the system comprising: limbs which are expanded from an initial position as a consequence of pressure loading to bring about a lengthening which can be transmitted to the part via a force transmission means to shift the part from the comfort position to the safety position, wherein the limbs are connected to one another and/or to fastening elements by joints, each having a first joint pin and a second joint pin which can be inserted axially into holes to form the joints, wherein at least one first joint pin is longer than a corresponding second joint pin to facilitate insertion of the first joint pin into one of the holes in an adjacent limb, wherein the corresponding second joint pin is insertable into a first slot of an impact plate, and wherein a third joint pin is axially aligned with the first joint pin, and extends in an opposite axial direction relative to the first joint pin to facilitate insertion of the third joint pin into a second slot of the impact plate.

2. The system as claimed in claim 1, wherein a first limb includes a first projection on an opposite lateral side of the first limb from a first joint, a second limb includes a second projection on an opposite lateral side of the second limb from a second joint, the first and second projections penetrate a metal structure of the vehicle seat, the first and second projections are configured to move away from one another as the limbs expand, and the force transmission means extends between the first and second projections.

3. The system as claimed in claim 2, wherein the projections penetrate the metal structure of the vehicle seat in a region of a cross member.

4. The system as claimed in claim 3, wherein the projections penetrate the metal structure of the vehicle seat towards the rear of the vehicle.

5. The system as claimed in claim 4, wherein the projections penetrate the metal structure of the vehicle seat towards the rear of the vehicle from an occupant's side of the vehicle.

6. The system as claimed in claim 1, wherein the force transmission means includes a cable.

7. The system as claimed in claim 6, wherein the cable includes a core and sheath.

8. A vehicle seat head restraint, comprising:

a head restraint having a part configured to be shifted from a comfort position into a safety position in the event of an accident; and an actuating system including limbs which are expanded from an initial position as a consequence of pressure loading to bring about a lengthening which can be transmitted to the part via a force transmission means to shift the part from the comfort position to the safety position, wherein the limbs are connected to one another and/or to fastening elements by joints, each having a first joint pin and a second joint pin which can be inserted axially into holes to form the joints;

wherein a first limb includes a first projection on an opposite lateral side of the first limb from a first joint, a second limb includes a second projection on an opposite lateral side of the second limb from a second joint, the first and second projections penetrate a metal structure of the vehicle seat, the first and second projections are configured to move away from one another as the limbs expand, and the force transmission means extends between the first and second projections.

9. The system as claimed in claim 8, wherein the force transmission means comprises a cable having a core and a sheath, an end of the core is coupled to the first projection, and an end of the sheath is coupled to the second projection.

10. The system as claimed in claim 8, wherein the projections penetrate the metal structure of the vehicle seat in a region of a crossmember.

11. The system as claimed in claim 8, wherein the projections penetrate the metal structure of the vehicle seat towards the rear of the vehicle.

12. The system as claimed in claim 11, wherein the projections penetrate the metal structure of the vehicle seat towards the rear of the vehicle from an occupant's side of the vehicle.

13. A head restraint for a vehicle seat, comprising:

a part configured to be shifted from a comfort position into a safety position in the event of an accident; and an actuating system including limbs which are expanded from an initial position as a consequence of pressure loading to bring about a lengthening which can be transmitted to the part via a cable to shift the part from the comfort position to the safety position, wherein the limbs are connected to one another and/or to fastening elements by joints, each having a first joint pin and a second joint pin which can be inserted axially into holes to form the joints, and wherein the cable includes a core and a sheath;

wherein a first limb includes a first projection on an opposite lateral side of the first limb from a first joint, a second limb includes a second projection on an opposite lateral side of the second limb from a second joint, the first and second projections are configured to move away from one another as the limbs expand, an end of the core is coupled to the first projection, and an end of the sheath is coupled to the second projection.

14. The system as claimed in claim 13, wherein at least one first joint pin is longer than a corresponding second joint pin to facilitate insertion of the first joint pin into a first slot of an impact plate.

15. The system as claimed in claim 14, wherein a third joint pin extends in an opposite axial direction relative to the corresponding second joint pin to facilitate insertion of the third joint pin into a second slot of the impact plate.

* * * * *